(12) United States Patent
Waldo

(10) Patent No.: US 8,206,492 B2
(45) Date of Patent: Jun. 26, 2012

(54) METHOD AND APPARATUS FOR CLEANING DIESEL PARTICULATE FILTERS AND FOR DIAGNOSING DAMAGE THERETO

(76) Inventor: Cole L. Waldo, Granite Falls, WA (US)

(*) Notice: Subject to any disclaimer, the term of this patent is extended or adjusted under 35 U.S.C. 154(b) by 711 days.

(21) Appl. No.: 12/080,686

(22) Filed: Apr. 4, 2008

(65) Prior Publication Data

US 2009/0056288 A1 Mar. 5, 2009

Related U.S. Application Data

(60) Provisional application No. 60/966,815, filed on Aug. 29, 2007.

(51) Int. Cl.
*B01D 46/04* (2006.01)
(52) U.S. Cl. .............................. 95/280; 55/294; 55/302
(58) Field of Classification Search ............... 55/283, 55/290, 293, 294, 302, 315, 467, 482, DIG. 30; 95/279, 281, 283; 96/417, 421; 210/411, 210/413; 60/310, 317; 123/198 E
See application file for complete search history.

(56) References Cited

U.S. PATENT DOCUMENTS

| | | | |
|---|---|---|---|
| 4,067,749 A | 1/1978 | McKinney | |
| 4,299,245 A | 11/1981 | Clapper | |
| 4,808,234 A | 2/1989 | McKay et al. | |
| 4,826,512 A * | 5/1989 | Fuller | 55/283 |
| 5,238,473 A * | 8/1993 | Femiani | 55/290 |
| 5,565,012 A * | 10/1996 | Buodd | 55/294 |
| 5,584,900 A * | 12/1996 | Zaiser et al. | 55/293 |
| 5,616,171 A * | 4/1997 | Barris et al. | 95/280 |
| 5,741,351 A * | 4/1998 | Beal et al. | 95/279 |
| 5,833,725 A * | 11/1998 | Dehn et al. | 55/302 |
| 5,915,439 A * | 6/1999 | Zaiser | 15/304 |
| 6,428,588 B1 * | 8/2002 | Holyoak et al. | 55/293 |
| 6,745,430 B2 * | 6/2004 | Holman et al. | 15/304 |
| 7,025,811 B2 * | 4/2006 | Streichsbier et al. | 95/279 |
| 7,371,266 B2 * | 5/2008 | Streichsbier et al. | 55/283 |
| 7,393,387 B1 | 7/2008 | Heisey | |
| 7,462,222 B2 * | 12/2008 | Sellers et al. | 95/279 |
| 7,856,809 B2 * | 12/2010 | During | 60/295 |
| 2004/0261375 A1 * | 12/2004 | Scheuch | 55/302 |
| 2006/0201326 A1 * | 9/2006 | Wagner et al. | 95/280 |
| 2009/0000471 A1 * | 1/2009 | Sellers et al. | 95/1 |

* cited by examiner

*Primary Examiner* — Duane Smith
*Assistant Examiner* — Minh-Chau Pham
(74) *Attorney, Agent, or Firm* — Todd N. Hathaway

(57) ABSTRACT

An apparatus for cleaning diesel particulate filters. First and second nozzle members direct flows of compressed air into the axially-extending filter cells from both ends of the filter, the nozzle members being offset so as to avoid blowing directly towards one another. The flows from the nozzles impinge only one or a few cells at a time. The nozzle members are moved over the entirety of the first and second end faces of the filter. The nozzles may be translated on arms while the filter is rotated simultaneously on a turntable or rollers. The filter and nozzles are housed within a cabinet having one or more windows, which enable an operator to view the cleaning process and also to identify filters having damaged media. The dislodged particulate material is withdrawn from the cabinet by an exhaust duct system.

17 Claims, 15 Drawing Sheets

METHOD AND APPARATUS FOR CLEANING DIESEL PARTICULATE FILTERS AND FOR DIAGNOSING DAMAGE THERETO

RELATED APPLICATIONS

This application claims the benefit of U.S. Provisional Patent Application Ser. No. 60/966,815 filed on Aug. 29, 2007.

BACKGROUND a. Field of the Invention

The present invention relates generally to methods and apparatus for cleaning particulate filters, and, more particularly, to a method and apparatus for effectively cleaning diesel particulate filters utilizing pressurized air applied to the ends of the filter in opposite directions.

b. Related Art

Clean air laws and regulations increasingly require that diesel engines be fitted with diesel particulate filters (referred from to-time-to time hereinafter by the abbreviation "DPF") to remove particulate matter from the exhaust before it enters the atmosphere. While perhaps most well known with respect to the diesel engines found in trucks and buses, such regulations increasing apply to railway locomotives, ferries and other marine vessels, and other pieces of equipment, which therefore must likewise be fitted with diesel particulate filters.

The great majority of diesel particulate filters are axial-type filters constructed of ceramic media. FIG. 2 shows the body of an exemplary DPF, with the metal casing removed for clarity. As can be seen, the filter body A is (in this example) cylindrical in shape, with first and second end faces B, C and a multiplicity of bores or cells D somewhat resembling a honeycomb structure (although normally with square rather than hexagonal holes), with the bores being generally aligned with the axis of the main exhaust flow. As can be seen in FIG. 3 the bores are alternatingly open on one end and blocked on the other, so that each cell having an open end on the "dirty" side (C) of the filter body and a blocked end on the "clean" side (B) is adjoined by cells having open ends on the "clean" side and blocked ends on the "dirty" side, and vice versa. Unfiltered exhaust therefore enters those cells having open ends on the "dirty" side of the filter, as indicated by arrow E and then passes laterally through the filter medium (arrows F) into the cells having open ends on the "clean" side, from which the filtered exhaust is then discharged (arrow G).

In so doing, the particulate material H in the exhaust (which may be carried in unburnt hydrocarbons) is captured on the walls of the cells that open to the "dirty" side of the filter. With continued operation of the engine the captured particulate matter accumulates, typically building up progressively from the closed end of the bores towards the open ends at the "dirty" side of the filter. As a result, the DPF eventually becomes choked, restricting the ability of the exhaust flow to pass through it and thereby decreasing the engine efficiency; ultimately, if left unchecked, plugging of the DPF can lead to serious engine damage.

Operating guidelines provided by engine manufactures and others therefore specify that the DPF must be removed and cleaned at certain intervals, stated, for example, in terms of operating hours or backpressure measurements. Since diesel engines commonly operate for long hours or even continuously in a commercial environment, DPFs must therefore be removed and cleaned on a fairly frequent basis. This represents a very significant undertaking in the case of fleet operators, who may be running hundreds or even thousands of engines. Moreover, because the cleaning intervals do not always coincide with visits to a central maintenance facility, or the operator may lack such a facility, the filters must frequently be cleaned at truck stop service garages or similar, geographically distributed facilities.

Heretofore, however, the actual equipment and methods used to clean DPF at such facilities have been largely unsatisfactory, in terms of efficiency or effectiveness or both. For example, in many instances the cleaning is performed on a strictly manual basis, with a person blowing compressed air from a hose against the "clean" side of the filter body; not only is this practice exceptionally labor intensive and inefficient, it in fact fails to remove much of the accumulated particulate matter and leaves a significant portion of it in the filter; as a result, the DPF is left partially clogged after cleaning, not only reducing the time before the next cleaning will be needed but also tending to shorten the total life of the filter. Furthermore, excessive manual handling of the DPF increases the opportunity for damaging to the relatively fragile ceramic body of the filter, which typically costs $4,000-$5,000 to replace.

In addition of manual cleaning, several at least partially mechanized/automated systems have been developed for cleaning DPFs or similar filters. For example, U.S. Pat. No. 7,025,811 (Streichsbier et al.) shows an apparatus in which the DPF is sealed to a base so that a suction is applied to the "dirty" side of the filter, and an air nozzle is played across the "clean" side of the filter automatically, either by moving the nozzle only or both moving the nozzle and rotating the filter. Although more efficient and less labor intensive, this system is little or no more effective at actually removing the particulate matter from the DPF than the manual process described above.

The approach of applying pressure ("blow") to the clean side of the filter and suction ("suck") to the other has been all but universal in prior machines developed to clean axial filers. The Streichsbier approaches described in the preceding paragraph is an example of one type, another being to apply a flow or pulses of air to the "clean" side of the filter, while simultaneously applying suction to the other end using a similar fitting. These machines in turn virtually all demonstrate marginal or poor cleaning efficiencies; for example, it is believed that a "pulsed" system of the type described is able to remove only about 65-80% of the accumulated particulate material at best: Applicant hypothesizes that this poor performance is due at least in part to the pressurized air to escape through a few cells once they have been cleared and offer a low-resistance path, leaving the particulate in the remaining cells more-or-less undisturbed.

Another filter cleaning apparatus is shown in U.S. Pat. No. 4,808,234 (McKay et al). In this device a filter is clamped between two end plates and rotated on a horizontal axis, while nozzles on a pair of elongate tubes are moved over interior and exterior surfaces of the filter. This apparatus is capable of achieving good cleaning results but by its nature it is limited to use with radial-type, hollow-core filters (usually paper), such as those commonly used in air filters for industrial facilities, and is incapable of functioning with an axial-type diesel particulate filter.

Another deficiency of prior filter cleaning machines in general is an inability to assess or determine the point at which cleaning of a particular filter is substantially complete. The typical approach has been to simply set the machine to continue cleaning for a particular period of time, usually an average determined on an empirical basis. In actuality, however, individual filters differ tremendously in terms of the amount of cleaning required, based on operating loads/conditions of the engine, fuel types, age/condition of the DPF, operating hours since last cleaning, and other factors. Consequently, simply cleaning all filters for a particular amount of time, without being able to verify the extent to which the process has actually been completed, can result in less than the maximum amount of particulate being removed in some cases and excessive, inefficiently long periods of cleaning in others.

Yet another deficiency, common to existing automated filter cleaning apparatus, is an inability to easily accommodate filters of different sizes and shapes. Although the majorities DPFs are presently cylindrical in shape, some are square/cuboid, as in the case of those used in some locomotives, or have other shapes. Moreover, even the cylindrical DPFs vary is size, in terms of both diameter and length, depending on manufacturer, engine model/size, and so on. Consequently, unless a facility is dedicated to servicing a single type of filter, an inability to accommodate DPFs of varying sizes and shapes in a rapid and efficient manner represents a serious drawback.

Another factor tending to reduce the efficiency of existing DPF cleaning facilities is the inability to quickly and effectively identify damaged/failed filters (e.g., filters with failed cells or broken media) and segregate them from the cleaning process. The conventional technique for inspecting filters for damage involves using a bore scope to examine individual cells, which is a laborious and time-consuming procedure which must be undertaken separately from the cleaning process itself. Inspecting the filters prior to cleaning this greatly slows the overall process, but if left undone the cleaning process may be wasted on damaged filers and moreover a possibility exists that damaged filters may remain undetected and returned to use.

Accordingly, there exists a need for an apparatus and method for cleaning diesel particulate filters in a rapid and efficient manner with minimal manual involvement. Furthermore, there exists a need for such an apparatus and method that effectively removes the great majority of accumulated particulate matter from the DPF, so as to both maximize time between cleanings and extend the service life of the filter. Still further, there exists a need for such an apparatus and method that permits assessment of progress of the cleaning process so as to be able to determine the point at which the process is substantially complete. Still further, there exists a need for such an apparatus and method that can accommodate different sizes and shapes of filters in a convenient and rapid manner. Still further, there exists a need for such an apparatus and method that reduces the possibility of physical damage to the ceramic media of the filters. Still further, there exists a need for such an apparatus and method that allows rapid identification of filter having damaged media without the need for a separate, time-consuming examination process.

SUMMARY OF THE INVENTION

The present invention has solved the problems cited above, and is an apparatus for pneumatic cleaning of diesel particulate filters having a multiplicity of generally axially extending filter cells, the apparatus comprising: (a) a first nozzle member positionable at a first end face of the diesel particulate filter that directs a flow of compressed air into the axially extending filter cells therefrom; (b) a second nozzle member positionable at a second, opposite end face of the diesel particulate filter that directs a flow of compressed air into the axially extending filter cells therefrom; and (c) means for moving the first and second nozzle members over substantially the whole of the first and second end faces so that compressed air is directed into substantially all of the filter cells from opposite directions so as to effectively dislodge and remove particulate material therefrom.

The means for moving the first and second nozzle members over the end faces of the diesel particulate filter may comprise means for translating the nozzle members across the end faces of the diesel particulate filter. The means for translating the nozzle members across the end faces of the diesel particulate filter may comprise first and second arms on which the nozzle members are supported, and means for extending and retracting the arms. The means for extending and retracting the arms may comprise first and second pneumatic cylinders having the arms mounted thereto.

The means for moving the first and second nozzle members over the end faces of the diesel particulate filter may also comprise means for rotating the diesel particulate filter as the first and second nozzle member direct the flows of compressed air into the axially-extending filter cells that the first and second end faces of the diesel particulate filter. The means for rotating the diesel particulate filter may comprise a turntable that supports and rotates the diesel particulate filter, the turntable having a substantially vertical orientation and a central opening through which one of said nozzle members accesses an end face of the diesel particulate filter. Alternatively, the means for rotating the diesel particulate filter may comprise first and second rollers that support and rotate the diesel particulate filter in a substantially horizontal orientation.

The means for extending and retracting the arms having the nozzle members thereon may further comprise means for adjustably regulating a length of stroke of the arms to match a predetermined diameter of the diesel particulate filter. The means for adjustably regulating the length of stroke may comprise an adjustable limit switch.

The nozzle members may each comprise at least one small-diameter nozzle that directs the flow of pressurized air into the filter cells in a substantially axial direction. Each small-diameter nozzle may comprise a small-diameter orifice sized such that when the nozzle is positioned a predetermined distance from one of the end faces of the diesel particulate filter, the flow of compressed air therefrom impinges only a small portion of the end face. The small portion of the end face may encompass only a relatively small number of the filter cells.

The small-diameter nozzles may each comprise an elongate tube member having a discharge orifice mounted at a distal end thereof. The first and second nozzle members may each comprise a single elongate tube member, or the nozzle members may each comprise a plurality of the elongate tube members. The tube members may extend substantially perpendicular to the end surfaces of the diesel particulate filter, or may be angled outwardly towards edges of the diesel particulate filter so as to access portions of said end surfaces that are located behind angular regeneration flanges at ends of the diesel particulate filter. The tube members may be formed of substantially soft, resilient material so as to avoid damaging the end faces of the diesel particulate filter in the event of contact therewith.

The turntable may comprise means for reversibly rotating the turntable in opposite directions. The drive for the turntable may comprise a large-diameter ring gear having the central opening formed therein, and a pinion gear and motor in operative engagement with the ring gear.

The turntable may also comprise means for supporting different diesel particulate filters having differing diameters so that end faces of the different filters are exposed at the central opening of the turntable. The means for supporting different diesel particulate filters having differing diameters may comprise a plurality of plate members that are interchangeably mountable under the turntable, each of the plate members having a central opening that is matched one of the differing diameters of the diesel particulate filters. The plurality of plate members may be mountable concentrically on the turntable.

The apparatus may further comprise means for selectively raising and lowering one of the first and second nozzle members relative to the turntable, so as to accommodate different diesel particulate filters having varying lengths.

The present invention also provides a method for cleaning a diesel particulate filter having a multiplicity of generally axially-extending filter cells, the method comprising the steps of: (a) positioning a first nozzle member at a first end face of the diesel particulate filter so as to direct a flow of compressed air into the axially-extending filter cells therefrom, (b) positioning a second nozzle member at a second, opposite end face of the diesel particulate filter so as to direct a flow of compressed air into said axially-extending filter cells therefrom, and (c) moving the first and second nozzle members over substantially the entirety of the first and second end faces of the diesel particulate filter, so that compressed air is directed into substantially all of the axially-extending filter cells from opposite directions so as to dislodge and remove particulate material therefrom.

The method may further comprise the step of visually observing a flow of particulate material dislodged and removed from the diesel particulate filter so as to determine when cleaning of the diesel particulate filter is substantially compete. The step of visually observing the flow of particulate material dislodged and removed from the diesel particulate filter may comprise viewing the first and second end faces of the diesel particulate filter through a window of a chamber that encloses the diesel particulate filter therein. The method may further comprise the step of visually observing the first and second ends of the diesel particulate filter so as to determine damage to the filter cells thereof, as indicated by a visible forceful discharge of particulate material from both the first and second end faces of the diesel particulate filter.

The step of moving the first and second nozzle members over the first and second end faces of the diesel particulate filter may comprise rotating the diesel particulate filter while simultaneously translating the first and second nozzle members over the end faces of the diesel particulate filter.

The steps of positioning the first and second nozzle members at the first and second end faces of the diesel particulate filter so as to direct flows of compressed air into the axially-extending filter cells therefrom may each comprise positioning a small-diameter orifice of the nozzle member proximate the end face of the diesel particulate filter so that the flow of compressed air is directed therefrom against only a small portion of the end face of the diesel particulate filter. The method may further comprise the step of applying an impact to the diesel particulate filter prior to or during application of the flows of compressed air thereto. The step of applying an impact to the diesel particulate filter may comprise subjecting the diesel particulate filter to a mild drop so as to impart the impact thereto.

The present invention also provides a method for identifying damaged diesel particulate filters having a multiplicity of generally axially-extending filter cells, the method comprising the steps of: (a) directing a flow of compressed air from a first nozzle member into the axially-extending filter cells from a first end face of the diesel particulate filter, (b) simultaneously directing a flow of compressed air from a second nozzle member into the axially-extending filter cells from a second, opposite end face of the diesel particulate filter, (c) moving the first and second nozzle members over substantially the entirety of the first and second end faces of the diesel particulate filter, so that the flows of compressed air are directed into substantially all of the filter cells from opposite directions so as to dislodge and remove particulate material therefrom, and (d) visually observing flows of the particulate material dislodged and removed from the diesel particulate filter so as to identify damage to the filter cells thereof, as indicated by a visible forceful discharge of the particulate material simultaneously from both the first and second end faces of the diesel particulate filter.

The step of visually observing the diesel particulate filter may comprise placing the diesel particulate filter in a chamber having the nozzle members therein, and observing the flow of dislodged particulate material through at least one window formed in the chamber.

These and other features and advantages of the present invention will be more fully understood and appreciated from a reading of the following detailed description with reference to the accompanying drawings.

DETAILED DESCRIPTION

Figure 1:
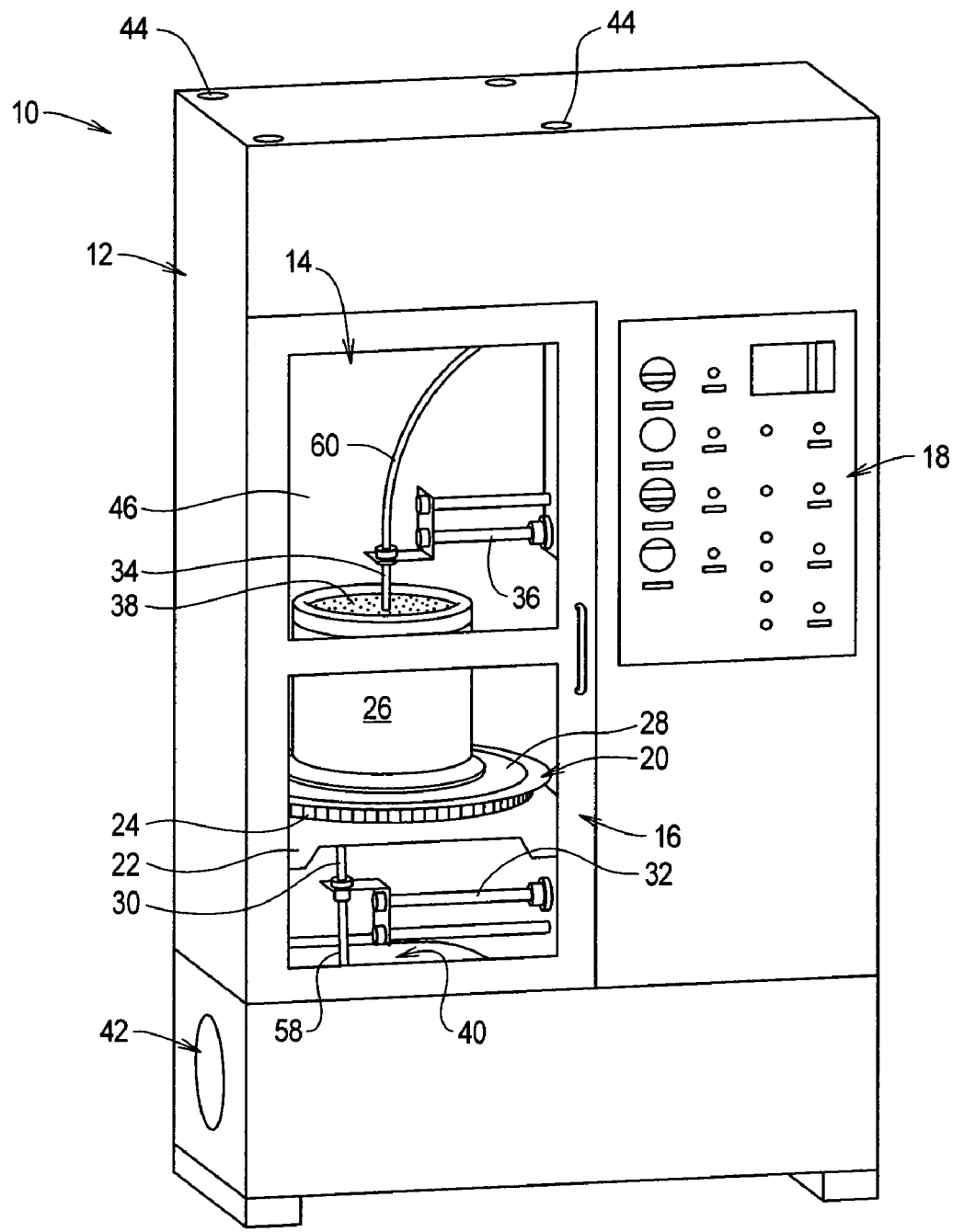
FIG. 1 is a perspective view of a DPF cleaning apparatus in accordance with the present invention, showing an exemplary filter placed in the apparatus for removal of accumulated particulate material therefrom.
Figure 2:
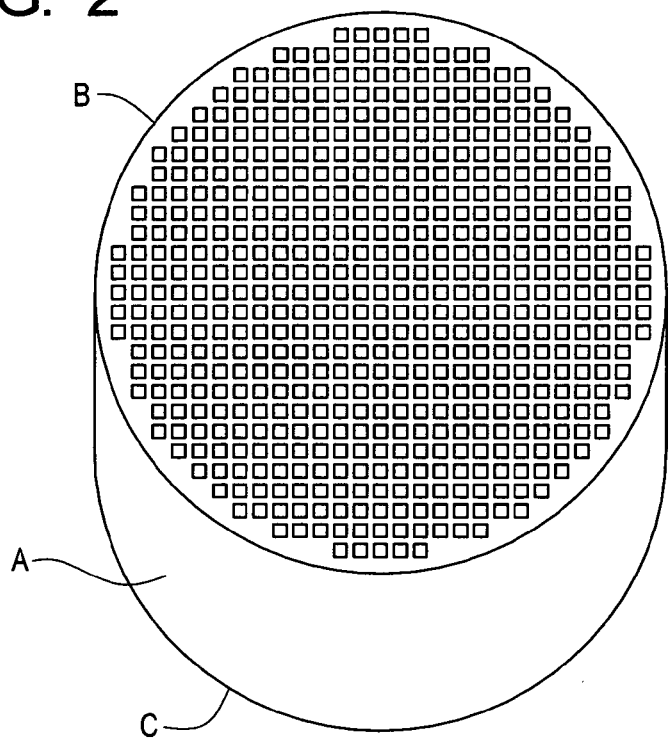
FIG. 2 is a perspective view of the ceramic body of a exemplary diesel particulate filter, showing the body removed from its case so as to provide a clearer view thereof.
Figure 3:
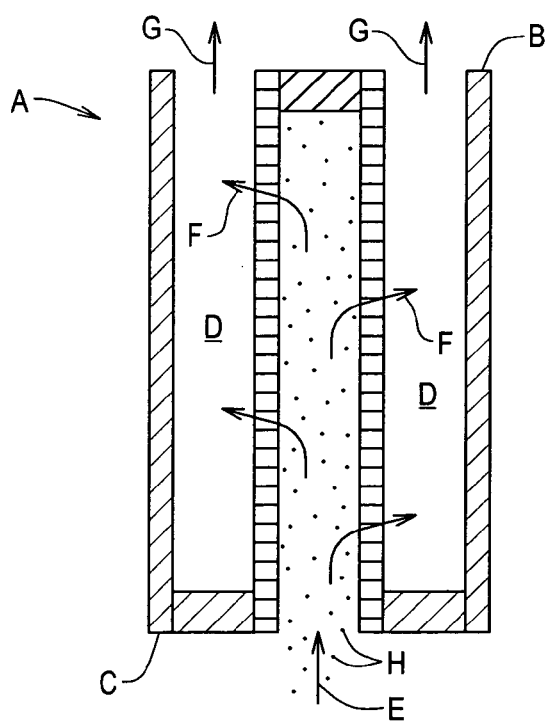
FIG. 3 is a cross-sectional, somewhat schematic view of a portion of the exemplary ceramic filter body of FIG. 2, with flow arrows indicating the passage of exhaust through the filter body and the capture of particulate matter therein.

FIG. 1 shows a diesel particulate filter (DPF) cleaning apparatus 10 in accordance with a preferred embodiment of the present invention. As can be seen, the apparatus includes a cabinet 12 having an enclosed cleaning chamber 14 that is accessible by a door 16 at the front of the cabinet, and a control panel 18 for controlling and monitoring operation of the apparatus, as will be described in greater detail below. A horizontal turntable assembly is mounted within the cleaning chamber, on a support 22, and includes a ring gear 24 and bearings (not shown) by which the turntable is rotated about a vertical axis. The DPF 26 is placed atop the turntable, on a ring-shaped adaptor plate 28 having a central opening (not visible in FIG. 1) through which the bottom surface of the filter is exposed. Pressurized air (or other suitable gas/fluid) is directed against the bottom surface of the filter by a first compressed nozzle 30 that is mounted on a extensible arm 32; similarly, a second nozzle 34 is mounted on an extensible arm 36 above the DPF, to direct compressed air in an opposite direction against the upper surface 38 of the filter.

As it will be described in greater detail below, the nozzles apply the compressed air more-or-less axially in opposite directions at the two ends of the DPF (i.e., to both the "clean" and "dirty" sides of the filter), while the arms are extended/retracted to translate the nozzles and the filter is rotated atop the turntable 20. In this manner, both wands pass over the entire faces of their respective ends of the filters, so that air enters the filter cells in a generally longitudinal direction and dislodges the particulate material therefrom. The released particulate material is contained within the cabinet chamber 14, which is a maintained under a negative pressure to prevent leakage/escape, and falls under a combination of air flow and gravity through a collection opening 40 at the bottom of the chamber. The collection opening is in communication with an exhaust duct (not shown in FIG. 1) that attaches to an exhaust opening 42 near the bottom of the cabinet and that conveys the particulate material to a dust collector or other disposable equipment, as will be described in greater detail below.

Small intake openings 44 in the top of the cabinet allow exterior air to be drawn into the cleaning chamber 14, ensuring a consistent, downwardly-directed flow of air therethrough. Bright lights (not visible in FIG. 1) inside the cabinet illuminate the cleaning chamber 14, enabling the operator to view and assess the amount of particulate matter suspended in the air via transparent (e.g., Lexan™ or Plexiglas) windows 46 in the door 16 and adjust operation of the machine accordingly.

It has been found in the present invention that directing the jets of compressed air against both sides of the DPF (i.e., against both the "clean" and "dirty" sides of the filter) achieves much more effective cleaning of the filters than conventional techniques in which air is directed against only the "clean" side of the filter. This result is somewhat counter-intuitive given that the particulate accumulations are almost solely on the "dirty" sides of the cells and reasons are somewhat unclear, but it is believed that the blast against the "dirty" side initially breaks up and/or partially dislodges the particulate deposits, which are then removed by the blast entering from the "clean" side. In any event, comparative testing has demonstrated that the method of the present invention can remove a significantly greater percentage of the particulate accumulation than is possible with prior techniques, therefore increasing time between cleanings and also enhancing service life of the filters.

Figure 4:
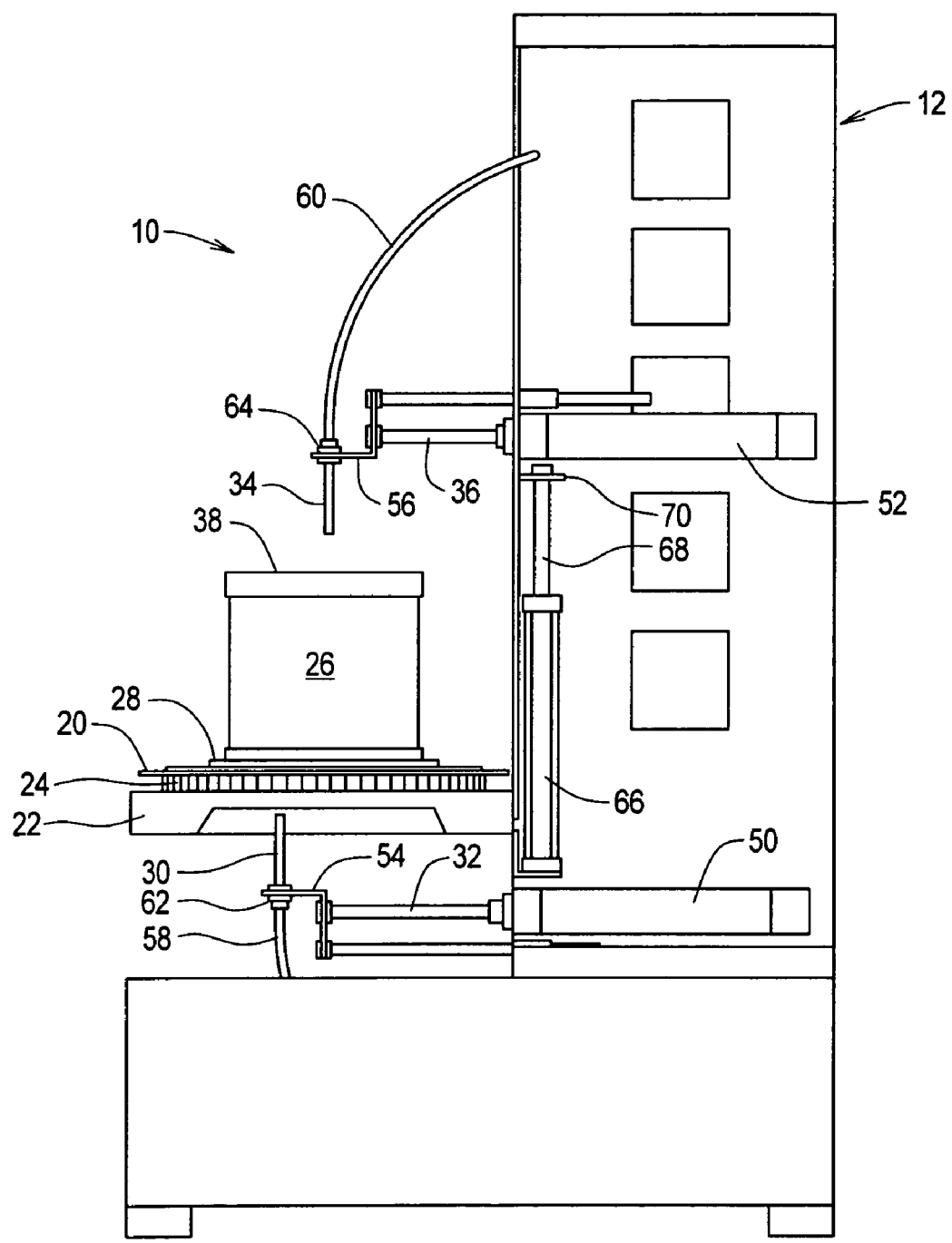
FIG. 4 is a cutaway elevational view of the filter cleaning apparatus of FIG. 1, showing the position of the exemplary diesel particulate filter relative to the turn table and air wands as the filter is initially placed in the machine.
Figure 5:
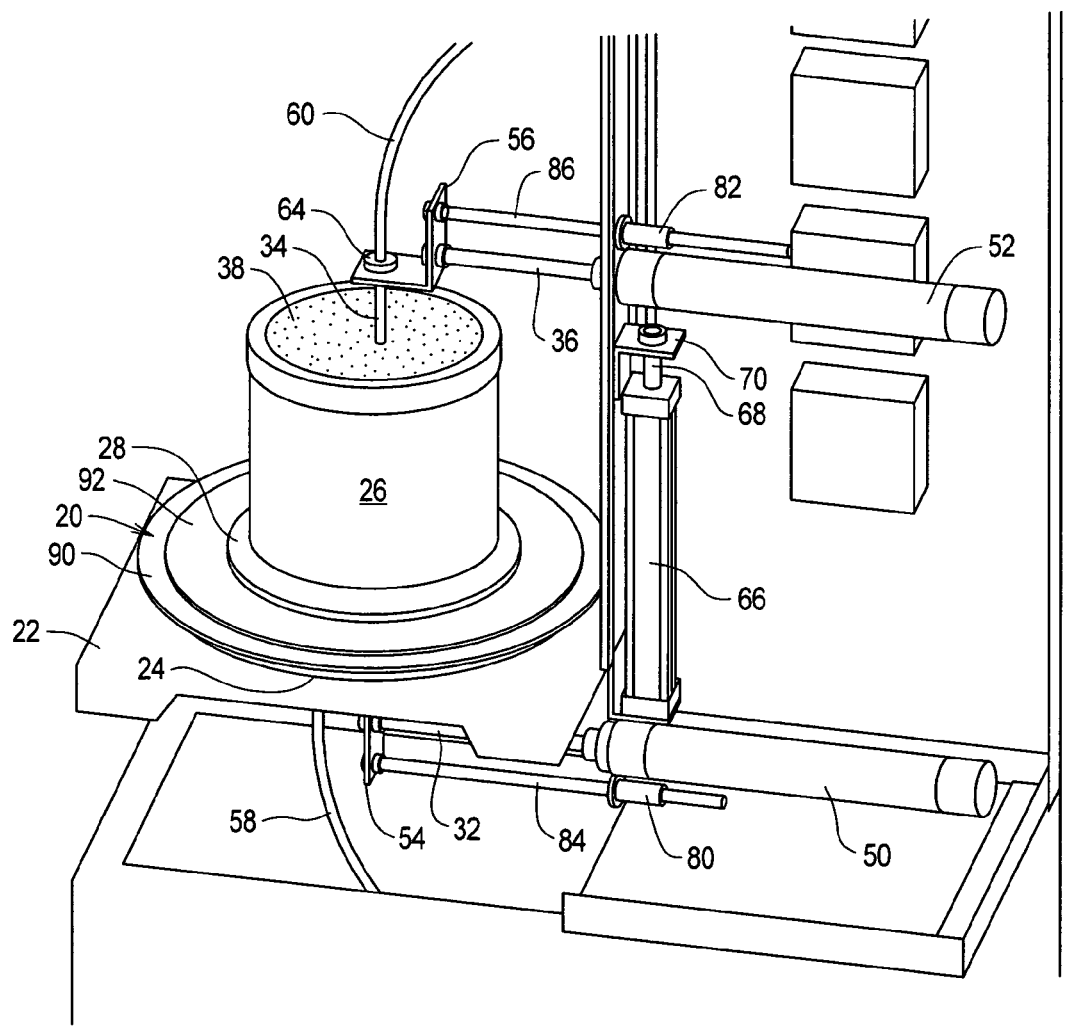
FIG. 5 is a cutaway perspective view of the cleaning apparatus of FIGS. 1 and 4, showing the air wand and turn table assemblies in greater detail.
Figure 6:
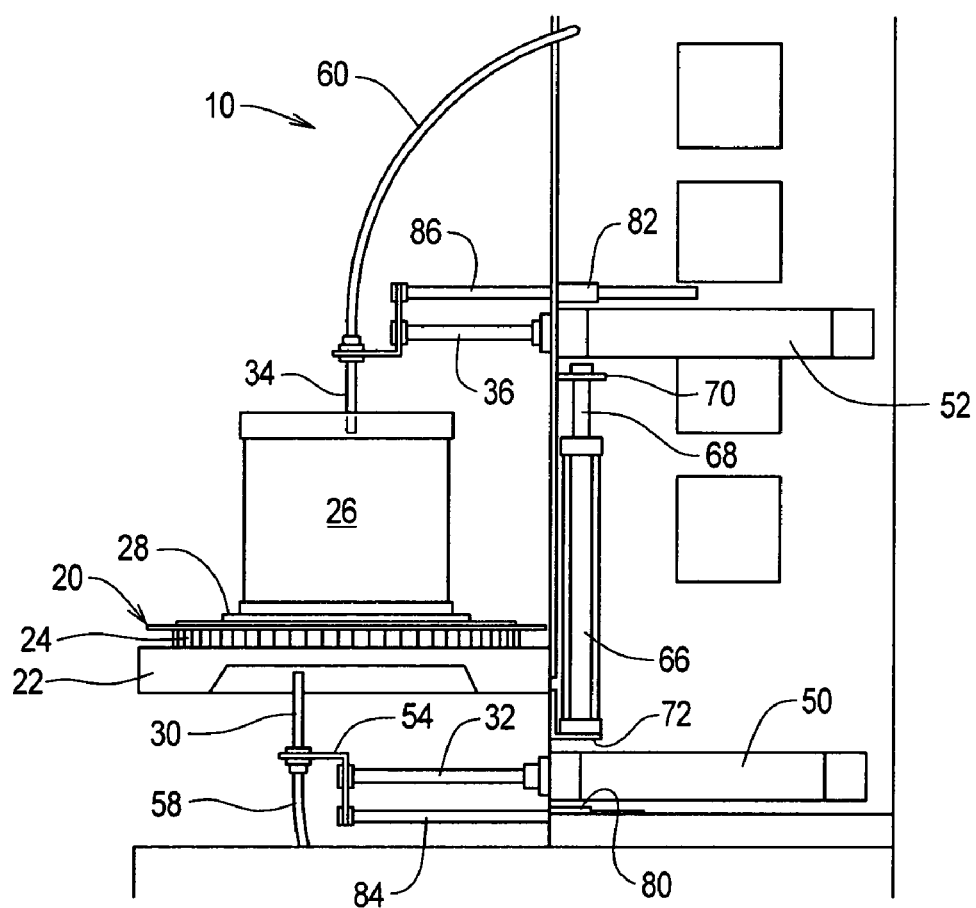
FIG. 6 is a cutaway, elevational view of the cleaning apparatus and exemplary DPF, similar to FIG. 4, showing the relationship of the air jets to the end surfaces of the filter during the cleaning process.

FIGS. 4-6 show the components of the cleaning apparatus 10 and the manner in which they interface with the DPF in greater detail.

As can be seen in FIG. 4 the horizontal, extensible shafts 32, 36 that support the lower and upper air nozzles 30, 34 are extended and retracted by pneumatic cylinders 50, 52, thereby translating the wands in a horizontal direction across the bases of the filter; it will be understood that other suitable mechanisms may also be used to move the nozzles, such as hydraulic cylinders, screw drives, and rack-and-pinion mechanisms, for example, some of which will be described in greater detail below.

The nozzles 30, 34 are mounted vertically on the ends of the shafts 32, 36, by brackets 54, 56, so that the nozzles 30, 34 align the flow of air axially into the bores of the DPF. Compressed air is supplied to the nozzles via flexible hoses 58, 60 that are connected to a pressure tank (not shown) or other suitable source, and that allow the nozzles to move back-and-forth without restriction, the hoses being connected to the nozzles by threaded fittings 62, 64 or other suitable couplings.

FIG. 4 shows the upper air wand in a raised position, providing clearance that allows the operator to place the DPF 26 atop the turntable 20. During the cleaning process, however, the upper wand is lowered so that its distal end rests adjacent or on the upper surface 38 of the filter, as shown in FIG. 5. Raising or lowering of the upper wand assembly is accomplished by operation of a vertical axis pneumatic cylinder 66, which extends/retracts a vertical rod 68 that is joined to the adjustable upper assembly by a first bracket 70, the lower end of the vertical cylinder being held stationary by a second bracket 72. Thus, retracting the rod 68 lowers the upper nozzle 34 to the upper surface of the filter, as shown in FIG. 6, while the lower nozzle remains adjacent the lower surfaces of the filter. The position of the upper, movable wand assembly can be adjusted by the operator, using the control panel of the machine, to accommodate filters having different heights. As with the horizontal pneumatic cylinders described above, it will be understood that other forms of mechanisms may be used to raise/lower the wand assembly relative to the turntable.

The nozzles 30, 34 are preferably formed of relatively soft vinyl straws, to avoid damaging the ceramic material of the DPF when making contact with the ends thereof. The straws preferably have a comparatively small diameter, suitably about ¼ inch, so as to concentrate the airflow over only a few cells at a time. Air is preferably provided to the nozzles on a substantially continuous basis during the cleaning process, suitably at about 90 psi, which yields very effective results; it will be understood, however, that some embodiments may utilize a pulsed airflow.

Moreover, while the illustrated embodiment has only one nozzle per end of the filter, it will be understood that some embodiments may feature multiple rather than single nozzles or continuous slots or similar openings in place of small, discrete nozzle openings, but that nevertheless concentrate the air flow or flows against individual cells or groups of cells as opposed to distributing it across the entire end of the filter. In general, however, embodiments that utilize such air wands or otherwise operate only a couple of small orifices at a time are suitable for the majority of facilities, while those with multiple or larger-sized nozzles are generally better suited to facilities having large-volume compressors that are capable of supplying the large volumes of air monitoring the necessary pressures.

Suitable nozzles of the types described above, some of which may be referred to as "air knives", are available from numerous suppliers in the compressed air/pneumatics industry.

During the cleaning operation, the turntable assembly 20 is rotated by a motor and a pinion gear (not shown) that engages the large-diameter ring gear 24 (again, it ill be understood that other suitable drive mechanism may be used). Simultaneously, the horizontal pneumatic cylinders 50, 52 are extended and retracted cyclically on an independent basis, so as to move the upper and lower air nozzles back-and-forth across the upper and lower surfaces of the DPF as the latter is rotated on the turntable; since the arms are not linked together and extend/retract independently, the locations of the nozzles are almost always offset so as to avoid the air blasts counteracting one another. The stroke of the wands is matched to the diameter of the oval faces, using limit switches or relays 80, 82 and associated rod members 84, 86 that extend/retract simultaneously with the shafts of the pneumatic cylinders; suitable unit switches and relays (e.g., "smart relays") are available from a number of commercial sources, and are easily adjusted by the operator (e.g., mechanically or electrically) so that the sweep of the nozzle will match the diameter of the filter; moreover, the operator can also adjust the stroke so that the effective diameter matches the width of a square, oval or other non-cylindrical DPF.

The combination of rotary and linear motion, with the air wands operating independently not only of each other but also of the rotation of the turntable, ensures that over a period of operation each nozzle will move across and cover the entire end surface of the filter in a substantially random pattern, thereby avoiding any missed or "bare" spots. In the illustrated embodiment, the turntable is suitably rotated at a speed of about 5 rpms, while the air wands suitably operate at a rate of about 15-20 cycles per minutes. The rotational speed of the turntable is furthermore preferably somewhat variable, either manually or automatically, to ensure thorough, even coverage and help prevent any tendency to develop "spirograph" patterns and missed spots that might result from certain combinations of fixed rotational and reciprocal speeds.

As noted above, the vertical adjustability of the upper air wand assembly allows the apparatus to accommodate filters of differing lengths/heights. The turntable assembly 20, in turn allows the machine to accommodate filters of differing diameters. As can best be seen in FIG. 5, the assembly includes an outer plate 90 having an inside opening that is sufficiently large for the largest-diameter DPF to be cleaned. The outer plate 90 is bolted or otherwise mounted to the ring gear 24 of the turntable, with additional, removable plates being set annularly within the outermost ring to accommodate filters of differing, smaller sizes; in the example that is illustrated in FIG. 5, a first annular plate 92 is set within the outer ring, and then another annular plate 28 is set within that to support the DPF 26, the innermost ring having an inside diameter which is matched to that of the filter. Each of the removable rings includes a depending lip or rim (which is not shown) that fits within and engages the opening of the next larger plate to maintain alignment between the pieces. In this manner, a series of annular plates can be provided that will allow the apparatus to accommodate a full range of DPFs having different diameters, e.g. 12", 14", 18" and so on.

In operation, it has been found advantageous to rotate the turntable first in one direction and then in the opposite (reverse) direction, while simultaneously operating the air wands in the manner described above; the reason why reversing direction of the turntable produces an enhanced cleaning effect is not fully understood, but it is believed that the air blast tends to enter the cells and impinge on the walls thereof in a slightly different angle or direction depending on the direction of rotation, resulting in a more complete dislodgement of the particulate material. Also, as noted above, it is generally preferable to vary the speed of rotation as well.

The first phase of cleaning is conducted with the "dirty" side of the DPF facing downwardly, so that the bulk of dislodged particulate material will drop more or less straight into the collection opening 40. The filter is then inverted for a second, shorter phase, during which the clean side of the DPF is directed downwardly. Although the foregoing sequence is preferred in terms of speed and efficiency, it has been found that the apparatus is capable of effectively cleaning DPFs even if left reversed (inverted) from their ideal orientation, the process simply being slowed to a degree; this is a significant advantage over prior cleaning systems, and obviates the problem of operator error when orienting the filters (in this regard, it should be noted that many DPFs lack arrows or other indicia of the "clean" and "dirty" sides, sometimes making it difficult for the operator to distinguish between the two).

Furthermore, the present invention enables the operator to quickly and accurately assess progress of the cleaning process, by observing the amount of particulate dust in the cleaning chamber. As noted above, both ends (top and bottom) are visible to the operator during the cleaning process, the lights preferably being positioned slightly above or to the side of the door and directed at the dislodged dust so that light reflected therefrom will be visible through the windows 46. Prior DPF cleaning apparatus in general do not allow any visual assessment of the process; for example, many prior devices, operating on the blow-suck principle, employ hat-like fittings that attach to or over the ends of the filters, so that the flow of air/dust is in no way visible, these systems mostly being operated on a set-time basis as described above. By placing the DPF in an independent suction chamber having a window or windows that permit the operator to observe the flow of air/dust at both ends of the filter, the present invention enables the operator to efficiently determine the point at which the cleaning process is substantially complete and can therefore be terminated. Furthermore, this assessment is achieved without the need for problematic electronic dust sensors, although such sensors or similar devices may be incorporated if desired. It has been found that the apparatus, operated in the foregoing manner, is able to clean the majority of truck/bus DPFs in a period of about 20-30 minutes, with no operator intervention except for the initial setup and an occasional glance through the windows in the door.

As part of the cleaning method, it has also been found advantageous to subject the DPF to a slight impact or "knock" prior to or during the pneumatic cleaning process. This may be accomplished manually, for example by the operator dropping the filter a few inches onto a wooden worktop, or it may be performed by the apparatus itself. For example, the apparatus may include one or more pneumatic jacks (not shown) that raise the support and turntable a short distance, together with the DPF resting thereon, and then drop the assembly against a stop or stops to apply an impact, either before or during the course of the pneumatic cleaning phases.

The ability to view both ends of the filter also makes it possible to quickly and efficiently identify damaged filters (e.g., filers having failed cells, cracked media, and so on), which as noted above has been problematic in prior systems. As the pressurized air is directed against both ends of the filer, damage to the filter media is indicated by the appearance of a pronounced cloud or "blast" of dust on the "clean" side of the filter; since a cloud of dust will normally exist on the "dirty" side of the filter regardless, a damaged filer is indicated when pronounced clouds of dust appear at both ends of the filter, hence the operator need not differentiate the "clean" and "dirty" ends in order to make the diagnosis. It should be noted that a slight "mist" of dust will ordinarily appear on the "clean" side of an undamaged filter when undergoing the cleaning process, owing to the flow of air being directed against the opposite, "dirty" side, but that in the case of a damaged filter the cloud of dust billowing from the "clean" side is much more pronounced and turbulent and therefore very easily identified by the operator, even at a quick glance. Hence, as an initial step in the process of the present invention, the operator can quickly diagnose damaged filters and remove them for repair or disposal, without having to examine the filters using borecope or other separate piece of equipment.

The embodiment illustrated in FIGS. 1 and 4-6 utilizes a basic combination of rotating turntable and single outlet, reciprocating upper and lower air wands, which configuration has particular advantages in terms of efficiency, easy of operation and low-volume air usage that make it well suited for use in many facilities. FIGS. 7-12, in turn, illustrate additional embodiments having drive mechanisms, air nozzle assemblies and other features that may also be advantageous for certain facilities and/or types of filters.

Figure 7:
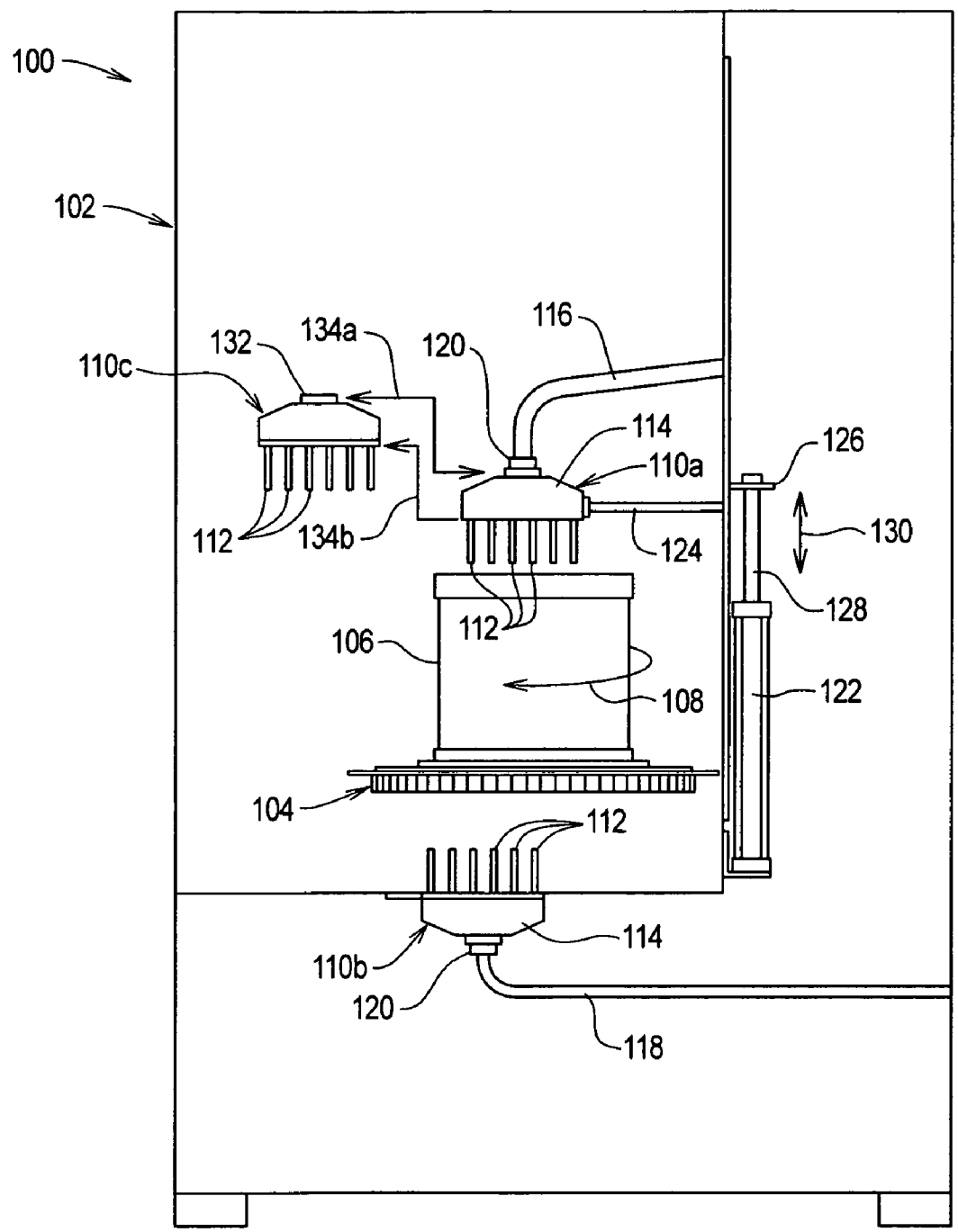
FIG. 7 is a cutaway elevational view, somewhat similar to FIG. 4, of a filter cleaning apparatus in accordance with another embodiment of the present invention, in which the rotating drive mechanism is similar to that of the embodiment described above, but in which the moving single-outlet air wands are replaced by stationary heads having multiple outlets from which the compressed is directed towards the ends of the DPF.

For example, FIG. 7 shows a DPF cleaning apparatus 100 in which the cabinet 102 and turntable 104 and associated components are substantially similar to their counterparts described above. The filters 106 therefore rotate in the manner previously described, as indicated by arrow 108. In place of the single outlet air wands that traverse the ends of the filter, however, the embodiment shown in FIG. 7 utilizes multiple outlet with heads 110a, 110b, each of which includes a plurality of straw-like nozzles 112 having distal ends that are directed towards the end faces of the DPF, and a plenum 114 by which the pressurized air is distributed to the individual nozzles. Air is supplied to the plenums, in turn, via lines 116, 118, that are attached to the nozzle heads 110a, 110b by couplings 120.

Rather than traversing back-and-forth across the end surfaces of the DPF, the multiple outlet nozzle heads 110a, 110b remain stationary while the filter rotates, the two head units being offset from one another so that none of the nozzles 112 are aligned in direct opposition. The upper nozzle head 110a is mounted to a pneumatic cylinder 122, by an arm 124 and bracket 126 that are attached to the extensible rod 128 of the cylinder, so that the upper head unit can selectively be raised/lowered as the DPFs are placed in or removed from the apparatus, and also to also accommodate filters of differing lengths, the upper air line 116 having a flexible segment mounting that enables it to move up-and-down with the head unit.

As noted above, the upper and lower nozzle heads 110a, 110b are offset so as to avoid the nozzles being directed towards one another. Furthermore, the nozzle assemblies have sufficient span (i.e., the distance between the nozzles at the ends of the heads) to extend at least from the outer edge of the DPF to (or past) the axial center of the filter, so that the entire end surfaces of the filter will be swept by the nozzles as the filter is rotated on the turntable 104. In order to accommodate DPFs of larger/smaller diameters, the apparatus may be provided with several nozzle units having differing (i.e., longer/shorter) spans, that are interchangeably mounted to the couplings 120; for example, FIG. 7 shows a third nozzle head 110c having a fitting 132 such that it is able to attach to the couplings 120 in the same manner as the others, as indicated by arrows, 134a, 134b (the particular head unit 110c in FIG. 7 is shown the same size as the other units 110a, 110b, however, it will be understood that other sizes may be provided as appropriate).

The spacing between the individual nozzles in each of the nozzle heads is selected to avoid gaps in coverage, based on the area over which the air spreads from the nozzle to the surface of the filter and other factors. The optimal size and pressure the flow discharged from each of the individual nozzles 112 of the multiple nozzle heads is substantially the same as for the single nozzle wands described above. Hence, since multiple nozzles are being fed simultaneously, the volume requirements will generally be much greater than with the embodiment described above and the compressed air supply should be sized accordingly.

Figure 8A:
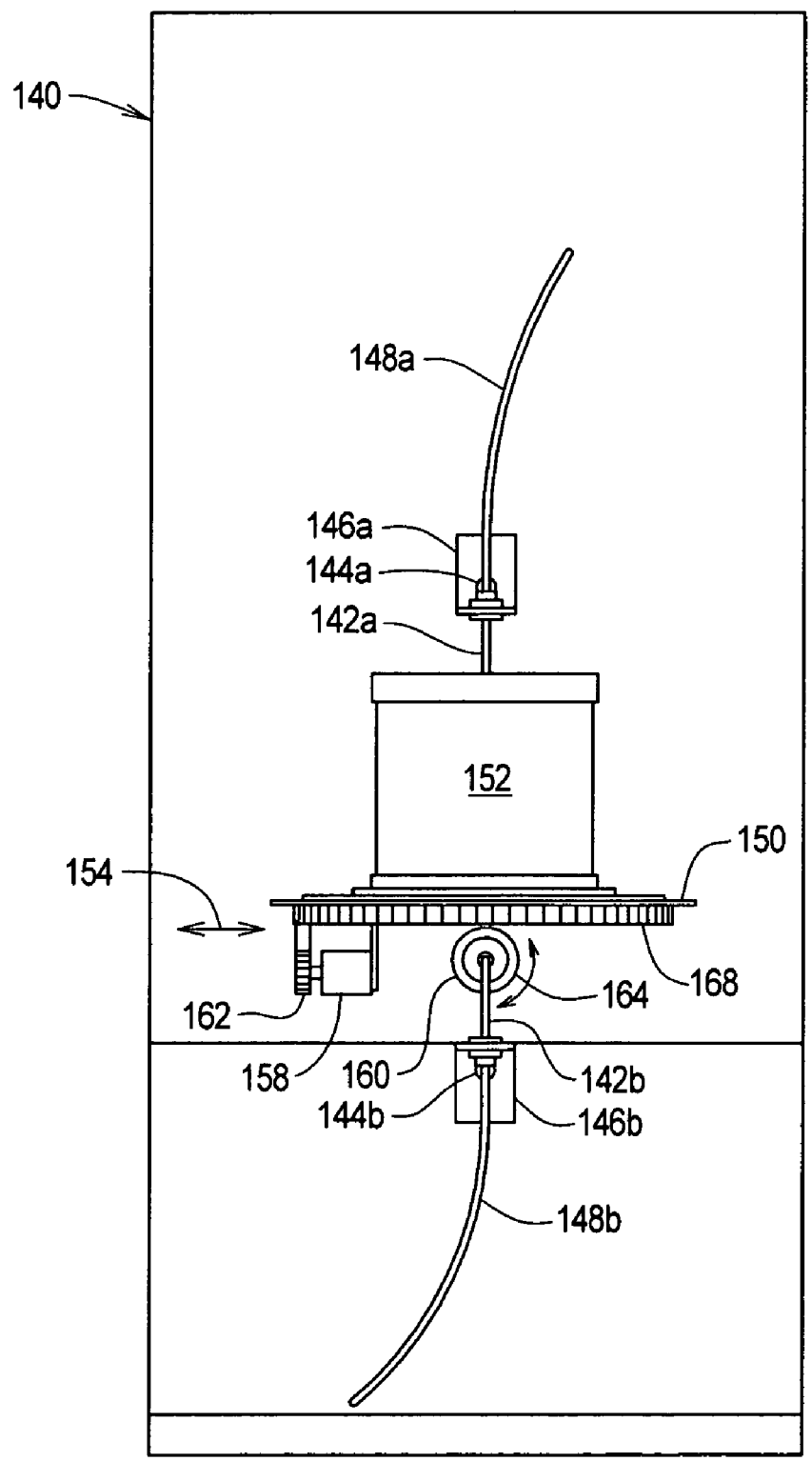
FIGS. 8A-8B are, respectively, front and side cutaway elevations views of a filter cleaning apparatus in accordance with another embodiment of the present invention which uses single outlet air wands similar to those shown in FIGS. 1-6, but in which the air wands are stationary and the table is driven front-to-back and side-to-side so as to move the DPF past the nozzles in both X- and Y-directions.
Figure 8B:
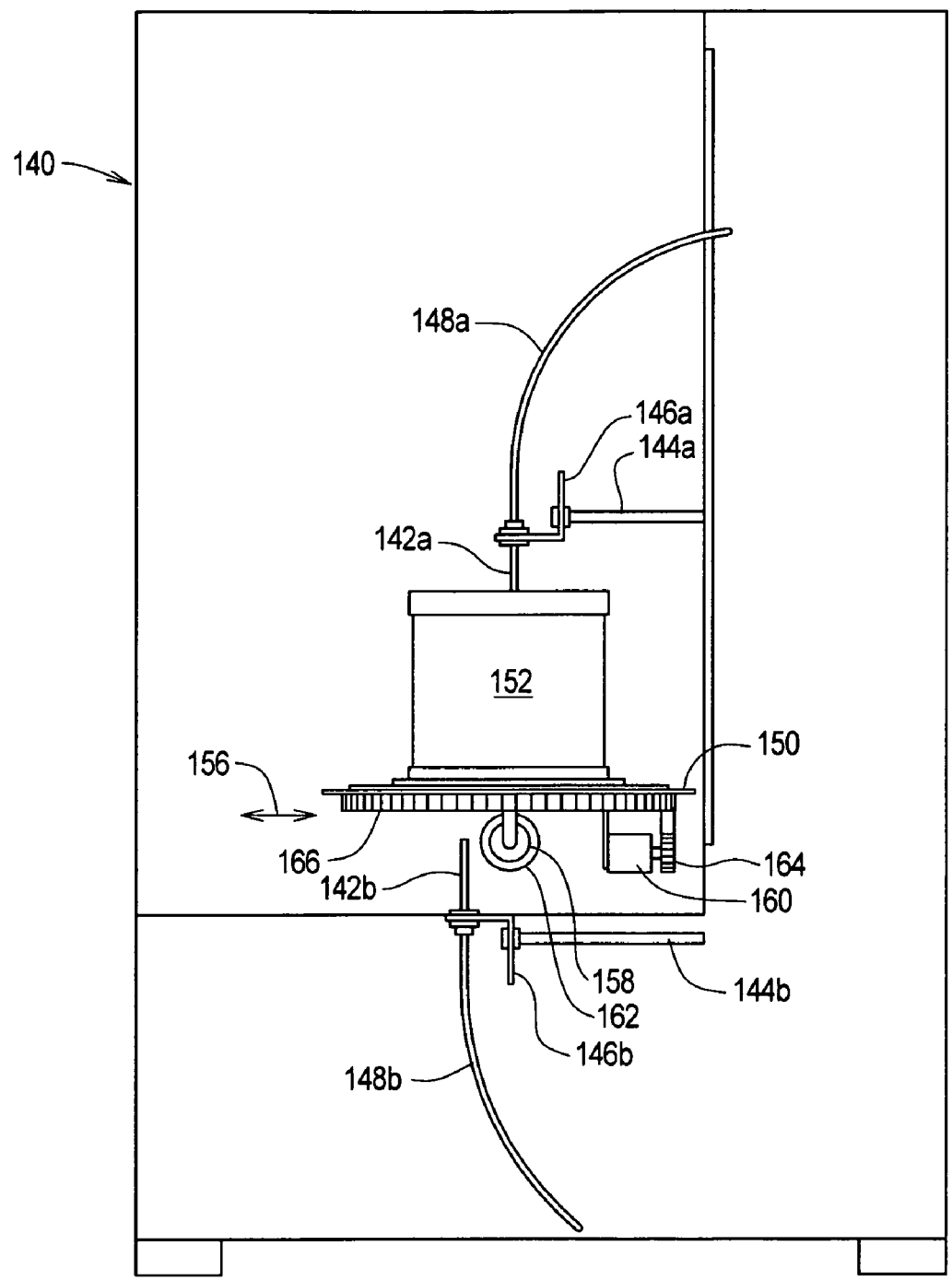

FIGS. 8A-8B, in turn, show a DPF cleaning apparatus 140 in which there are single outlet air nozzles 142a, 142b that are held stationary, being mounted to fixed lengths of rods 144a, 144b by brackets 146a, 146b (although not shown, the upper rod may be connected to a pneumatic cylinder or other mechanism for raising/lowering the upper air wand 142a, in a manner similar to that shown in FIGS. 7A-7B, with compressed air being supplied to the wands via upper and lower air lines 148a, 148b.

The fixed position upper and lower air wands 142a, 142b are offset from one another in a vertical direction, so as to prevent the air jets from being in direct opposition, again similar to the embodiment described above. However, rather than being rotated, the table 150 that supports the DPF 152 is driven in first and second, "X" and "Y" directions within the horizontal plane, as indicated by arrows 154, 156: In the illustrated embodiment, the horizontal translation of the table is achieved by means of first and second motors 158, 160 which drive pinion gears 162, 164 that are in engagement with front-to-rear and side-to-side gear racks 166, 168 mounted on the underside of the table. One or the other of the motors is suitably operated in a step-wise manner, moving the filter in one direction row-by-row, while the other motor is operated to sweep the air wands back and forth along the rows, thus covering the entirety of both end faces of the filter.

The embodiment of FIGS. 8A-8B, provides a linear motion of the filter in "X" and "Y" directions rather than rotating it and is particularly suited to use in cleaning cuboid filters having square or rectangular end faces, although it can be used with the more common cylindrically-shaped filters as well. It will also be understood that other drive mechanisms may be used to develop the X-Y motion, in place of or in conjunction with the gear and rack arrangement shown in FIGS. 4-6, such as a table driven by horizontal pistons or rams, for example.

Figure 9A:
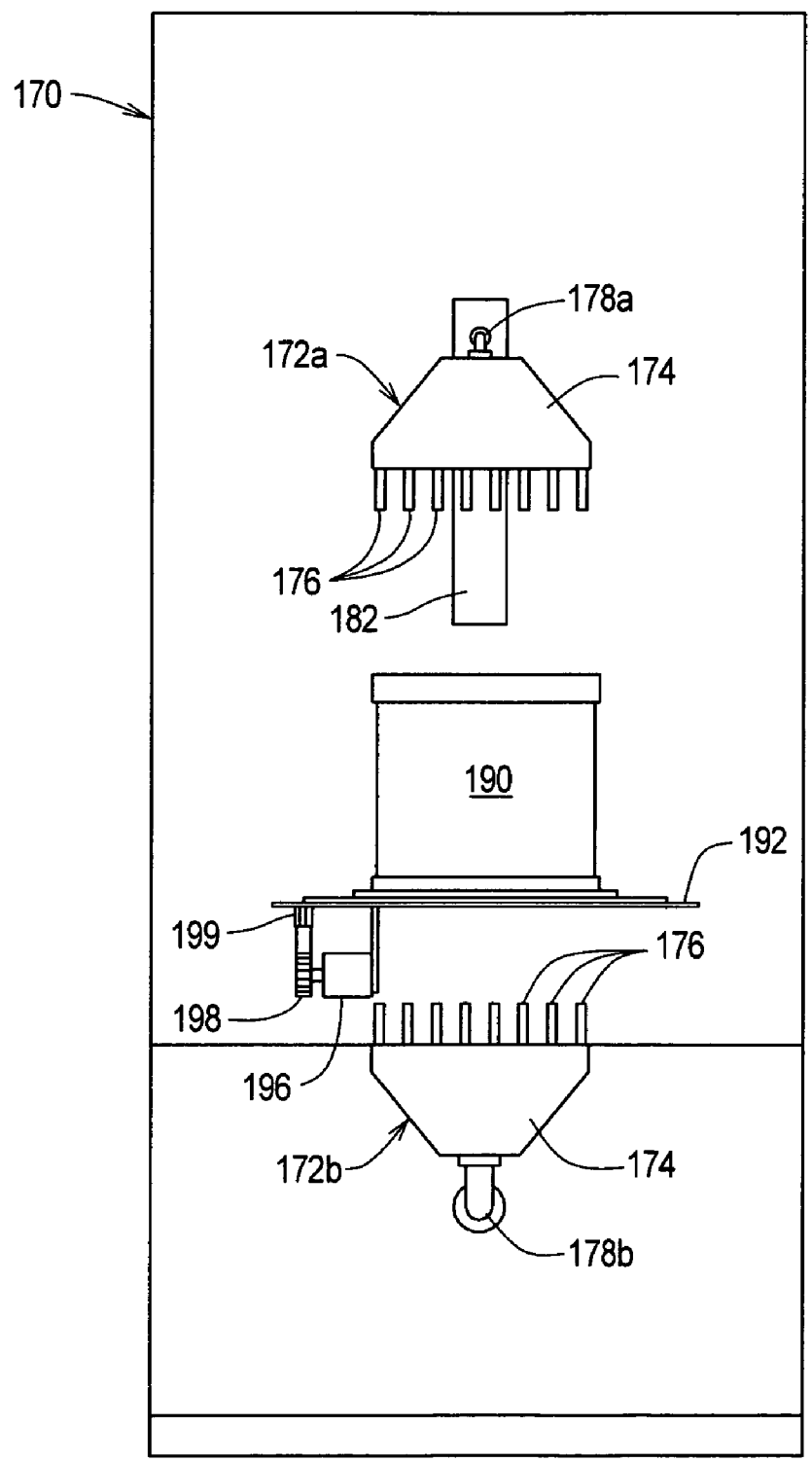
FIGS. 9A-9B are, respectively, front and side cutaway elevational views of a filter cleaning apparatus in accordance with another embodiment of the present invention, which uses stationary, multiple-outlet airheads that span the width of the DPF, and in which the table is driven in a single, front-to-back direction to move the DPF linearly past the nozzles.
Figure 9B:
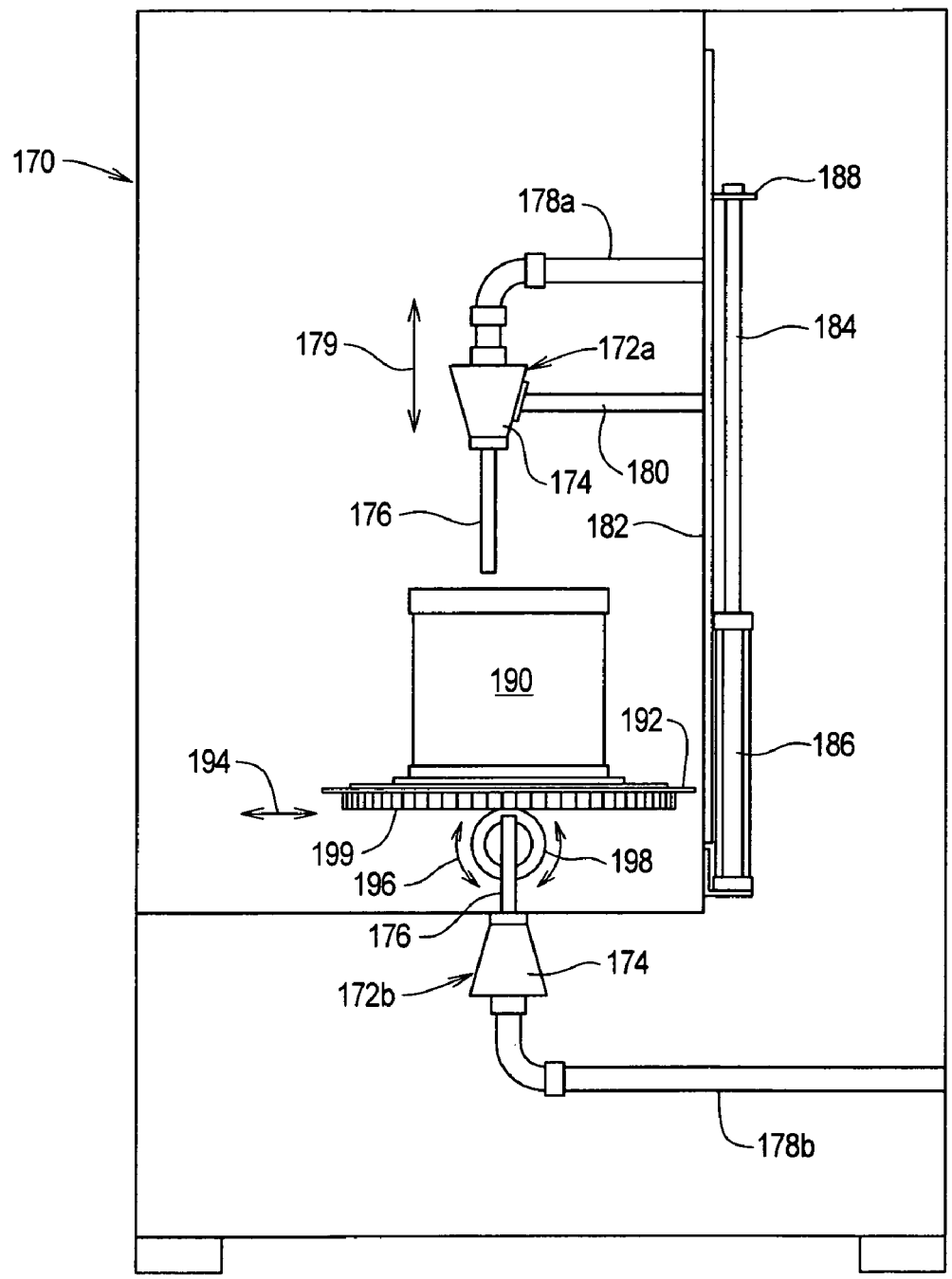

FIGS. 9A-9B show a cleaning apparatus 170 in accordance with another embodiment in which the filter is moved linearly, but in this case in one direction only rather than two. Rather than the single outlet air wands of the embodiment shown in FIGS. 8A-8B, the cleaning apparatus 170 utilizes two multi-outlet nozzle heads 172a, 172b similar to those shown in FIG. 7, each having a plenum 174 and multiple nozzle outlets 176, compressed air being supplied to the plenums via upper and lower air lines 178a, 178b. Similar to the embodiments described above, the upper nozzle head 172a is adjustable vertically, as indicated by arrows 179, in this instance being supported on a rod 180 that is mounted to a vertically slidable panel 182, which in turn is mounted to the shaft 184 of a pneumatic cylinder 186 by a bracket 188.

As can be seen in FIGS. 9A-9B, the upper and lower nozzle heads 172a, 172b are mounted substantially parallel to one another, so that the two rows of nozzles 176 lie in generally parallel planes, but are again offset so as to avoid direct opposition. The jets of air from the upper and lower nozzle heads 172a, 172b consequently impinge offset rows of cells on the upper and lower ends of the DPF 190, as the latter is supported on table 192, the arrays of nozzles 176 having sufficient breadth to span the entire width/diameter of the filter. The table and filter are then driven in a single, reversible direction perpendicular to the rows of nozzles 176, as indicated by arrow 194 in FIG. 9B, by means of a motor and pinion gear in engagement with a gear rack 199 mounted on the underside of the table. The rows of nozzles therefore sweep across the entirety of both end surfaces of the filter 190, as the latter is moved forwardly and backwardly below/above the nozzles.

In addition to being particularly suited to use with square or rectangular filters, the embodiment show in FIGS. 9A-9B has the added advantage of potentially quicker cleaning times. A potential disadvantage, as compared with the other embodiments, is the possibility of less thorough or uniform cleaning, due to the strictly linear motion and absence of any "random" aspect to the paths followed by the nozzles. Also, as with the other multiple-nozzle embodiment described above, air volume requirements are significantly higher than with the single-nozzle embodiments.

Figure 10A:
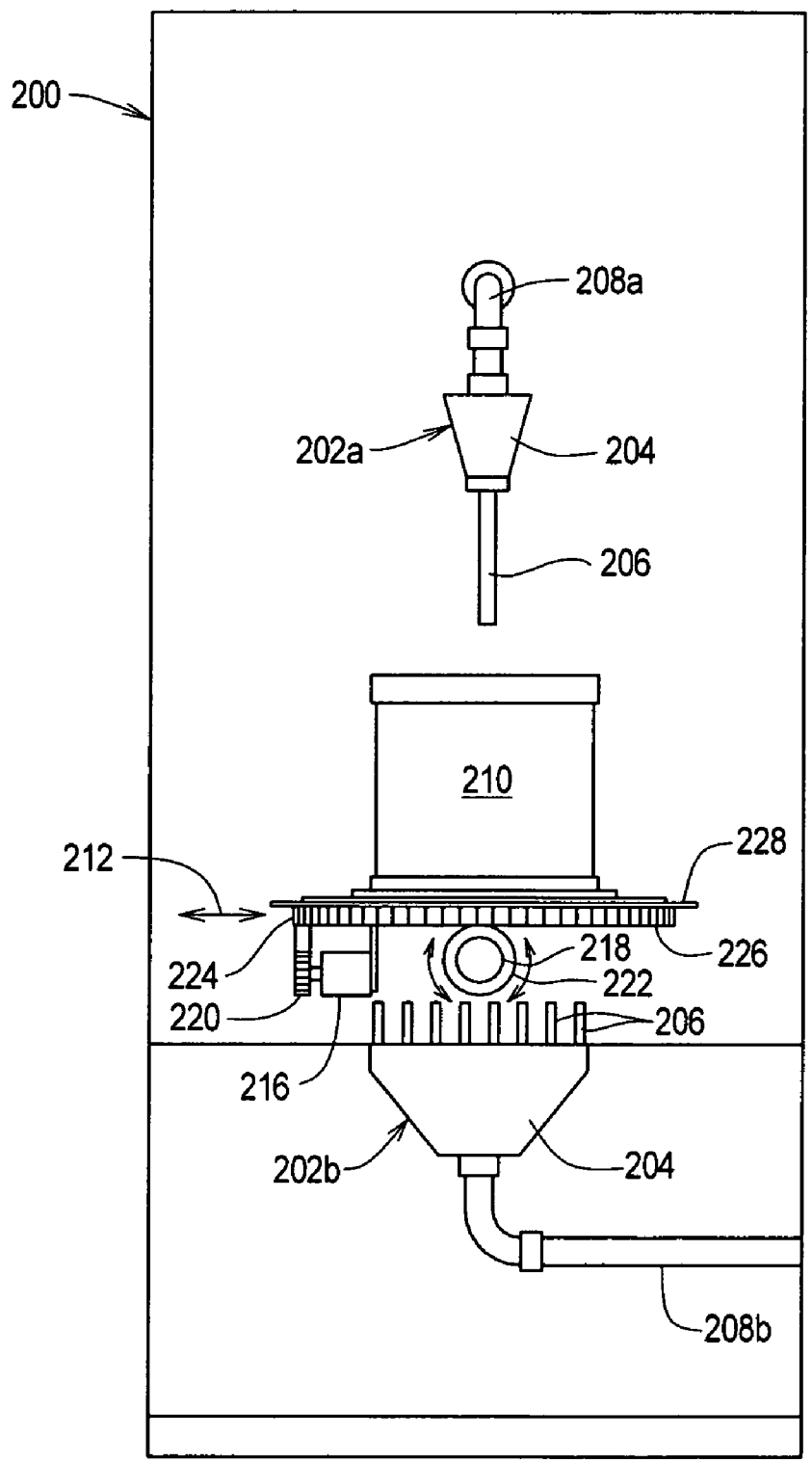
FIGS. 10A-10B are, respectively, front and side elevational views of a filter cleaning apparatus in accordance with another embodiment of the present invention, which uses stationary airheads having multiple nozzles arranged in-line, with the nozzles being oriented at right angles to one another and the table having a drive mechanism that moves the DPF thereon in X- and Y-directions past the nozzles.
Figure 10B:
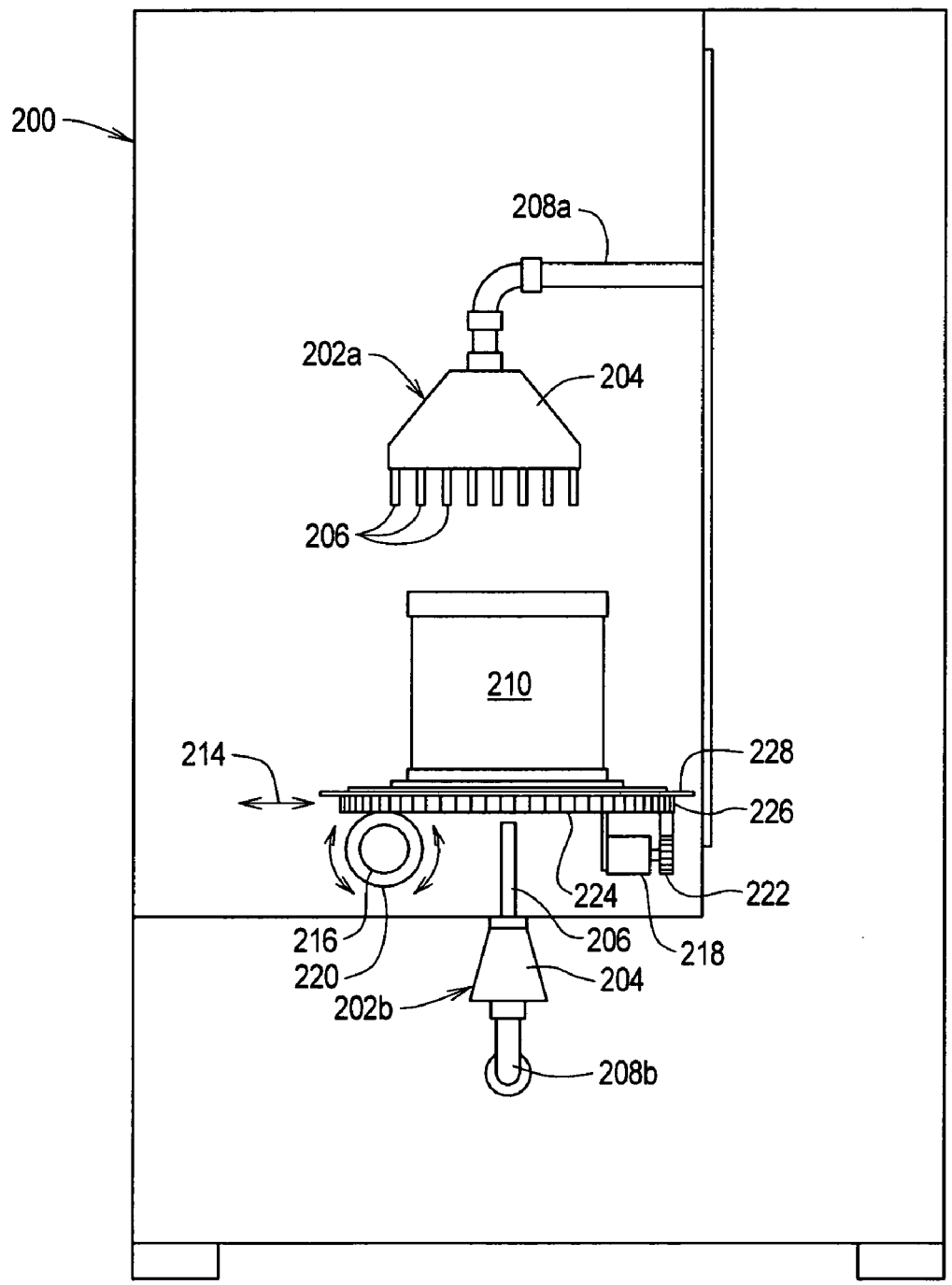

FIGS. 10A-10B show a cleaning apparatus 200 in accordance with another embodiment that employs multiple-nozzle heads, with the upper and lower head units 202a, 202b being aligned at right angles to one another (i.e., in a "+" configuration when seen in plan view). As before, the heads each include a plenum 204 and multiple nozzles 206, with compressed air being fed to the plenums via upper and lower air lines 208a, 208b.

In this embodiment, the DPF is driven past the rows of nozzles in first and second, X-Y directions, as indicated by arrows 212, 214; similar to the arrangement in FIGS. 8A-8B, movement is accomplished by motors 216, 218 that drive pinion gears 220, 222 in engagement with gear racks 224, 226 on the underside of the filter support table 228. Again, these motions, which may suitably be performed in the stepwise manner, continue to effectively sweep the nozzles over the entirety of both ends of the filter.

Figure 11A:
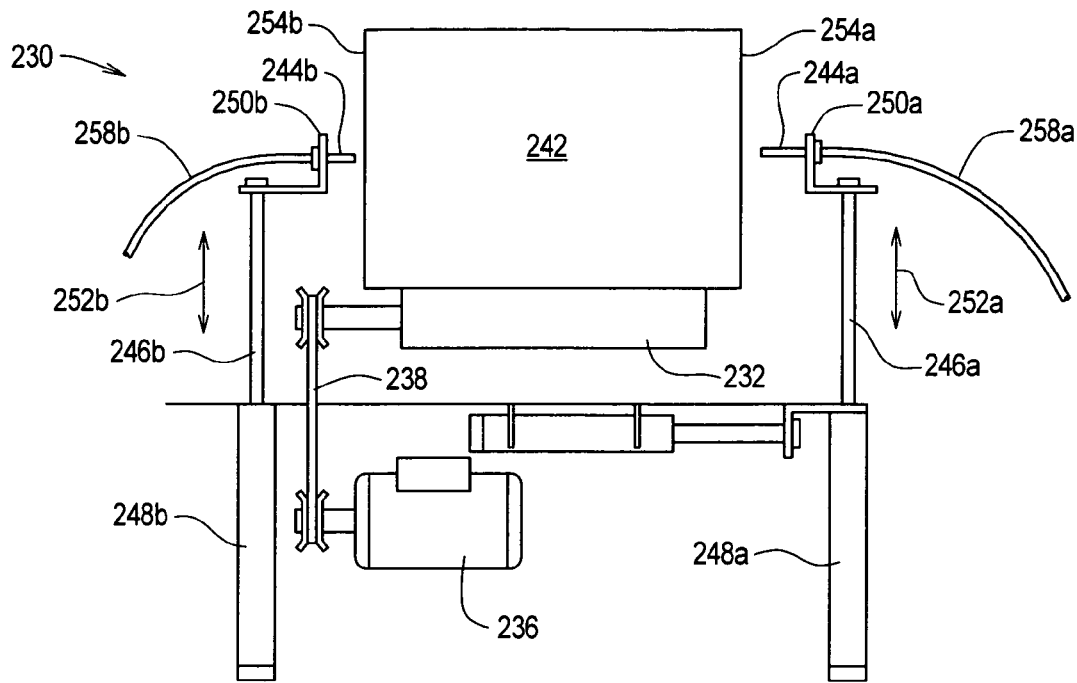
FIGS. 11A-11B are, respectively, front and side elevational views of a filter cleaning apparatus in accordance with another embodiment of the invention, in which the DPF is supported horizontally on and rotated by a set of rollers, with first and second air wands that are moved across the ends of the DPF as the latter is rotated.
Figure 11B:
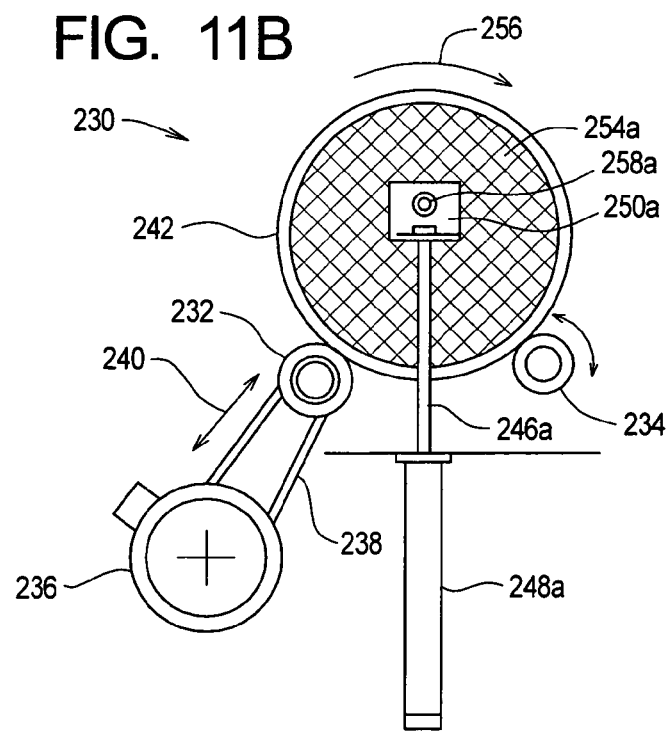

The embodiments that have been described to this point have featured mechanisms that support the DPF in a vertical orientation (i.e., so that the cells in the medium run vertically), which provides significant advantages, for example, that gravity helps carry the dislodged particulate matter downwardly out of the cells during the cleaning process. FIGS. 11A-11B, in turn, show a cleaning apparatus that is supported and rotated and a horizontal orientation, which may advantageous for some applications.

As can be seen, the filter cleaning apparatus 230 includes a pair of spaced-apart rollers 232, 234, that extend substantially parallel to one another, generally in a common horizontal plane, roller 232 being driven from a motor 236 via a belt 238, as indicated by arrow 240, and roller 234 being an idler (for east of understanding, certain supports and bearings are not shown in FIGS. 11A-11B, but their location and nature will be apparent to one of ordinary skill in the relevant art). The spaced apart rollers 232, 234 support the DPF 242 in a horizontal orientation when the latter is placed on the rollers, as shown in FIGS. 11A-11B. Each of the rollers is preferably covered with a sheath or layer of rubber or similar resilient material, in order to protect the filter and also to help the drive roller 232 to establish traction against the exterior of the filter.

First and second air wands 244a, 244b are similar to the air wands in FIGS. 4-6, except for being aligned in a horizontal direction. The wands are consequently mounted to the extensible/retractable rods 246a, 246b of vertically-aligned pneumatic cylinders 248a, 248b, on brackets 250a, 250b. The rods 246a, 246b are reciprocated in the directions indicated by arrows 252a, 252b in order to sweep the wands 244a, 244b across the ends 254a, 254b of the DPF as the latter is rotated on the rollers in the direction indicated by arrow 256, with the vertical movement of the wands being accommodated by flexible air supply lines 258a, 258b. The air wands thus cover the entirety of both ends of the filter in a manner similar to that described with reference to FIGS. 4-6. As also mentioned above, the drive motor may be reversed and/or operated at variable speeds in order to help ensure thorough coverage.

The chamber (not shown) surrounding the cleaning mechanism 230 shown in FIGS. 11A-11B is suitably generally similar to that shown in FIG. 1, rearranged slightly to accommodate the horizontal orientation of the filter and the associated flows of air and dust.

Figure 12:
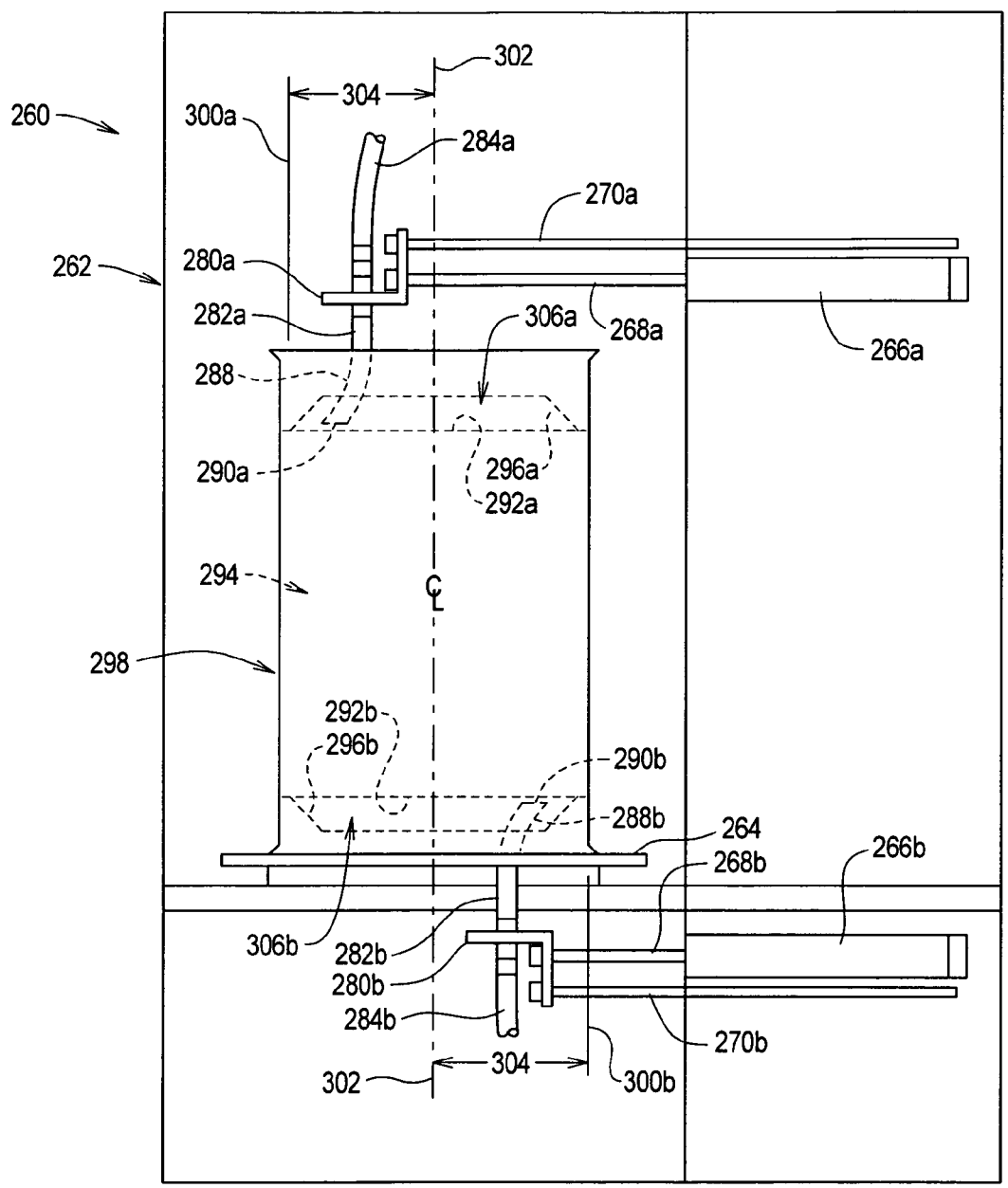
FIG. 12 is a side elevational view of a filter cleaning apparatus in accordance with another embodiment of the present invention, that is similar to the embodiment of FIGS. 4-6 but that includes air wands having bent/angled ends that reach behind inwardly-projecting regeneration flanges that are a feature of certain DPFs, so as to clean the areas of the filter that would otherwise be blocked or screened by the flanges.

FIG. 12 shows a DPF cleaning apparatus 260 that is generally similar to that shown in FIGS. 1 and 4-6, except for the particular configuration of the upper and lower air wands. The apparatus consequently includes a housing 262, a rotating turntable 264, upper and lower pneumatic cylinders 266a, 266b with extensible/retractable rams 268a, 268b, associated guide rods 270a, 270b, and end brackets 280a, 280b that support the air wands 282a, 282b and associated compressed air supply air supply lines 284a, 284b.

Unlike the embodiments described above, rather than being straight the end portions 288a, 288b of the wands 282a, 282b are curved/bent outwardly, so that the ends of the wands are offset towards an edge of the filter from the main vertical axes of the wands, the distal ends 290a, 290b of the wands are in turn cut or otherwise formed so that the airflow therefrom is directed generally vertically against the end surfaces 292a, 292b of the filter and into the cells of the filter medium 294.

The curved, offset ends of the air wands 282a, 282b enable them to reach behind/under inwardly-angled flanges 296a, 296b that are mounted at the ends of the filter 298, so as to reach the ends of the cells in the annular zones that the flanges 296a, 296b so that they cannot be accessed by straight, perpendicular air wands. As the turntable 264 is rotated, the upper and lower curved air wands 282a, 282b are reciprocated back and forth by pneumatic cylinders 266a, 266b, together with the associated rods and guides, from the edges of the filter body 294 (as indicated by dashed lines 300a, 300b) back to or beyond the central axis 302 of the filter (as indicated by arrows 304a, 304b), thereby sweeping the wands across the entire end surfaces of the filter body, including the areas under the annular flanges 26a, 26b.

By way of background, the purpose of the flanges 296a, 296b is to create "regeneration zones" 306a, 306b at the ends of the filter, and are a feature of certain makes and types of DPF that employ what is sometimes referred to as "active regeneration". These filters have heretofore been very difficult to clean at all, let alone efficiently, with the area under the flanges being virtually inaccessible to prior equipment. The present invention has therefore solved this very significant problem, in addition to providing the other benefits noted above.

Figure 13:
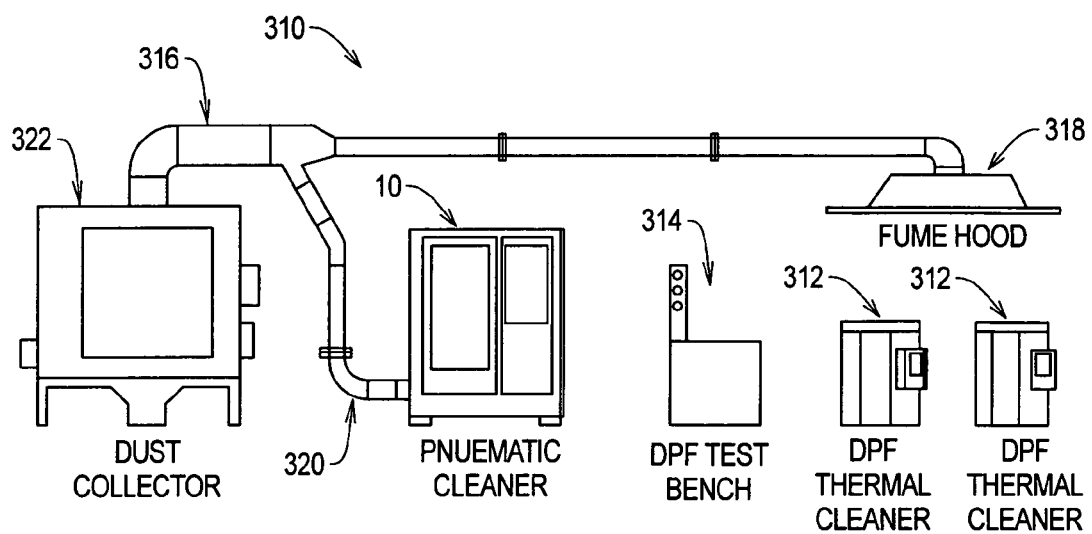
FIG. 13 is an elevational, somewhat schematic view of a DPF cleaning facility, showing the manner in which the cleaning apparatus, for example, of FIGS. 1 and 4-6, can be installed in conjunction with additional equipment employed in the cleaning process.

FIG. 13 shows an exemplary DPF cleaning facility 310 that includes the pneumatic cleaning apparatus 10 described above. The facility includes DPF thermal cleaners 312 for pretreatment of filters that are In addition, to be choked with excess hydrocarbons (oil, unburned fuel, etc.); the thermal cleaners are effectively sealed kilns, in which a controlled burn of the hydrocarbons is performed, leaving only particulate matter for subsequent removal. Also included is a test bench 314, including suitable fittings and flow meters, for verifying completeness of cleaning and also for identifying physical damage or other problems, e.g., cracks or holes in the ceramic material of the filters. A dust and fume collection system 316 includes a hood 318 for gathering fumes emanating from the thermal cleaners and other equipment, as well as an exhaust duct 320 that draws air and suspended particulate matter from the exhaust opening 42 of the pneumatic cleaning apparatus. The exhaust flow passes from the collection system 316 through a dust collector 322 and/or other filtering equipment prior to being discharged to the atmosphere.

The present invention thus provides a highly effective method and apparatus by which diesel particulate filters can be cleaned efficiently and with minimal manual intervention. The apparatus is able to accommodate different sizes and shapes of filters in a rapid and convenient manner, and it is amenable to installation in a facility that is eminently suitable for either fleet centralized cleaning stations or geographically disbursed service facilities.

It is to be recognized that various alterations, modifications, and/or additions may be introduced into the constructions and arrangements of parts described above without departing from the spirit or ambit of the present invention as defined by the appended claims.

What is claimed is:

1. An apparatus for pneumatic cleaning of diesel particulate filters having a multiplicity of generally axially-extending filter cells, said apparatus comprising:
    a first nozzle member positionable at a first end face of said diesel particulate filter that directs a flow of compressed air into said axially-extending filter cells therefrom;
    a second nozzle member positionable at a second, opposite end face of said diesel particulate filter that directs a flow of compressed air into said axially-extending filter cells therefrom; and
    means for moving said first and second nozzle members over substantially the whole of said first and second end faces so that compressed air is directed into substantially all of said filter cells from opposition directions so as to effectively dislodge and remove particulate material therefrom.

2. The apparatus of claim 1, wherein said means for moving said first and second nozzle members over said end faces of said diesel particulate filter comprises:
    means for translating said nozzle members across said end faces of said diesel particulate filter.

3. The apparatus of claim 2, wherein said means for translating said nozzle members across said end faces of said diesel particulate filter comprises:
    first and second arms on which said nozzle members are supported; and
    means for extending and retracting said arms.

4. The apparatus of claim 1, wherein said means for moving said first and second nozzle members over said end faces of said diesel particulate filter comprises:
    means for rotating said diesel particulate filter as said first and second nozzle members direct said flows of compressed air into said axially-extending filter cells at said first and second end faces of said diesel particulate filter.

5. The apparatus of claim 4, wherein said means for rotating said diesel particulate filter comprises:
    a turntable that supports and rotates said diesel particulate filter, said turntable having a substantially vertical orientation and a central opening through which one of said nozzle members accesses an end face of said diesel particulate filter.

6. The apparatus of claim 4, wherein said means for rotating said diesel particulate filter comprises:
    first and second rollers that support and rotate said diesel particulate filter in a substantially horizontal orientation.

7. The apparatus of claim 4, further comprising:
    means for translating said first and second nozzle members across said end faces of said diesel particulate filter as said filter is rotated.

8. The apparatus of claim 7, wherein said means for translating said first and second nozzle members across said end faces of said diesel particulate filter comprises:
    first and second arms on which said nozzle members are supported; and
    means for cyclically extending and retracting said arms as said diesel particulate filter is rotated.

9. The apparatus of claim 8, wherein said means for cyclically extending and retracting said arms comprises:
    first and second pneumatic cylinders having said arms mounted thereto.

10. The apparatus of claim 8, wherein said means for extending and retracting said arms having said nozzle members thereon further comprises means for adjustably regulating a length of stroke of said arms to match a predetermined diameter of said diesel particulate filter.

11. The apparatus of claim 10, wherein said means for adjustably regulating said length of stroke of said arms comprises:
    an adjustable limit switch.

12. The apparatus of claim 5, wherein said turntable comprises:
    means for reversibly rotating said turntable in opposite directions.

13. The apparatus of claim 5, wherein said turntable comprises:
    a large-diameter ring gear having said central opening formed therein; and
    a pinion gear and motor in operative engagement with said ring gear.

14. The apparatus of claim 5, wherein said turntable comprises:
    means for supporting different diesel particulate filters having differing diameters so that end faces of said different filters are exposed at said central opening of said turntable.

15. The apparatus of claim 14, wherein the means for supporting different diesel particulate filters having differing diameters comprises:

a plurality of plate members that are interchangeably mountable under the turntable, each of said plate members having a central opening that is matched to one of said differing diameters of said diesel particulate filters.

16. The apparatus of claim 15, wherein said plurality of plate members are mountable concentrically on said turntable.

17. The apparatus of claim 5, further comprising:
means for selectively raising and lowering one of said first and second nozzle members relative to said turntable, so as to accommodate different diesel particulate filters having varying lengths.

* * * * *